US012457406B2

(12) United States Patent
Jin et al.

(10) Patent No.: US 12,457,406 B2
(45) Date of Patent: Oct. 28, 2025

(54) MOBILE SINGLE LEAF SCANNER

(71) Applicant: Purdue Research Foundation, West Lafayette, IN (US)

(72) Inventors: Jian Jin, West Lafayette, IN (US); Yikai Li, Bear, DE (US)

(73) Assignee: Purdue Research Foundation, West Lafayette, IN (US)

( * ) Notice: Subject to any disclaimer, the term of this patent is extended or adjusted under 35 U.S.C. 154(b) by 99 days.

(21) Appl. No.: 18/531,487

(22) Filed: Dec. 6, 2023

(65) Prior Publication Data

US 2024/0187723 A1 Jun. 6, 2024

Related U.S. Application Data

(60) Provisional application No. 63/430,644, filed on Dec. 6, 2022.

(51) Int. Cl.
*H04N 23/61* (2023.01)
*G06V 10/58* (2022.01)
*H04N 23/51* (2023.01)
*H04N 23/56* (2023.01)

(52) U.S. Cl.
CPC ............. *H04N 23/61* (2023.01); *G06V 10/58* (2022.01); *H04N 23/51* (2023.01); *H04N 23/56* (2023.01); *G06V 2201/07* (2022.01)

(58) Field of Classification Search
CPC ................................ H04N 23/61; G06V 10/58
USPC ..................................................... 348/222.1
See application file for complete search history.

(56) References Cited

U.S. PATENT DOCUMENTS

| 6,164,755 | A | 12/2000 | Yamamoto |
| 9,841,322 | B1 * | 12/2017 | Kemeny ................ G01J 3/108 |
| 10,586,353 | B2 * | 3/2020 | Yoshimura ........... G06V 10/751 |
| 11,815,788 | B2 * | 11/2023 | Jin ....................... H04N 23/695 |
| 2010/0111369 | A1 * | 5/2010 | Lussier ............. G01N 21/6486 |
| | | | 356/417 |
| 2010/0177951 | A1 | 7/2010 | Vodanovic |
| 2021/0334952 | A1 * | 10/2021 | Kalluri ................. G06T 7/0004 |
| 2021/0338054 | A1 | 11/2021 | Halderman et al. |
| 2022/0357634 | A1 | 11/2022 | Jin et al. |

FOREIGN PATENT DOCUMENTS

| CN | 213398444 | 6/2021 |
| CN | 214540328 | 10/2021 |

\* cited by examiner

*Primary Examiner* — Lin Ye
(74) *Attorney, Agent, or Firm* — Piroozi-IP, LLC

(57) ABSTRACT

A leaf imaging system is disclosed which includes a leaf-handling subsystem which includes a first leaf contactor and a second leaf contactor and configured to receive a leaf in therebetween, and an encoder coupled to one of the first or second leaf contactors, the encoder configured to selectively trigger a camera corresponding to motion of the leaf. The leaf imaging system further includes a lightbox in communication with the leaf-handling subsystem and configured to provide light to the leaf as the leaf passes between the first and the second leaf contactors; and a controller in communication with the encoder, the camera, and the lightbox and configured to operate the camera based on output of the encoder.

20 Claims, 7 Drawing Sheets

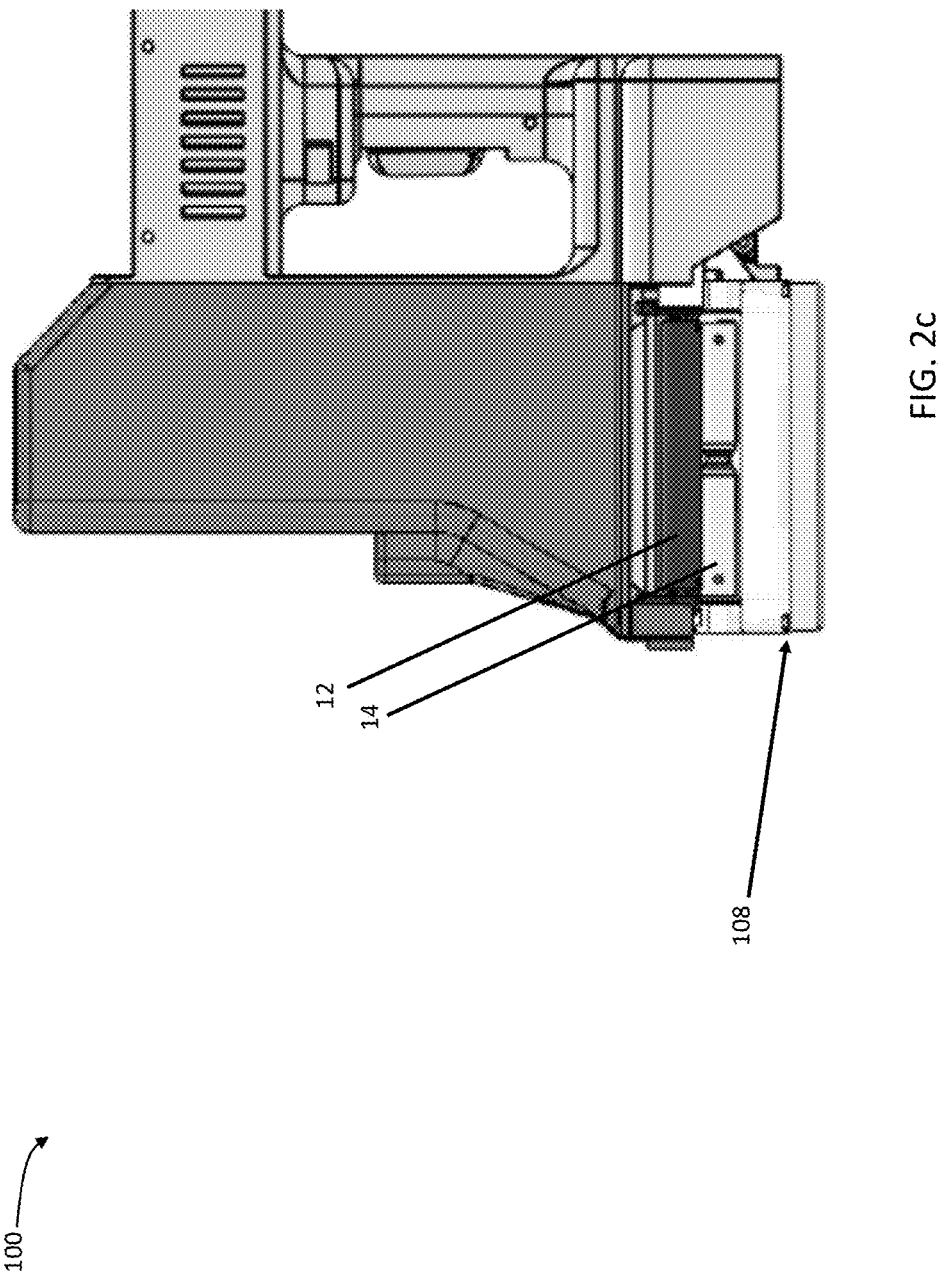

MOBILE SINGLE LEAF SCANNER

CROSS-REFERENCE TO RELATED APPLICATIONS

This patent application claims priority to a U.S. provisional patent application Ser. 63/430,644 filed Dec. 6, 2022, contents of which are incorporated by reference in its entirety into the present disclosure.

STATEMENT REGARDING GOVERNMENT FUNDING

None.

TECHNICAL FIELD

The present disclosure generally relates to plant phenotypic systems, and in particular to a leaf imaging system capable of automatic energization of the imaging system as a leaf enters the system.

BACKGROUND

This section introduces aspects that may help facilitate a better understanding of the disclosure. Accordingly, these statements are to be read in this light and are not to be understood as admissions about what is or is not prior art.

A plant phenotyping system is required for plant researchers and precision agriculture in order improve high yields and also develop new genotype as well as to monitor plant health. Specifically, precision agriculture is now ubiquitously used to optimize crop yield especially in light of decades-long drought conditions in vast areas of the country by using systems with feedback to provide water where needed, improve monitoring of crop health, and minimizing environmental impact by optimizing fertilizers and insecticides to only area where these potentially harmful chemicals are deemed to be necessary. Furthermore, where new plants are being planted, it is necessary to understand and quantify plant growth and structure at a large scale.

Various imaging techniques have been used to image leaves of plants for determination of plant health. One such imaging technique is based on Hyperspectral Imaging system (HIS) which require placement of the leaf in a flat and repeatable manner for any automatic imaging system. However, automatic leaf-handling mechanisms suffer from inconsistently accepting leaves into an imaging chamber; thus, resulting in loss of quality and necessity for repeating the imaging procedures.

Therefore, there is an unmet need for a novel imaging system that can provide consistent phenotyping images of leaves to be used for high precision agriculture and phenotyping studies such that leaves of plants are processed consistently.

SUMMARY

A leaf imaging system is disclosed which includes a leaf-handling subsystem which includes a first leaf contactor and a second leaf contactor and configured to receive a leaf in therebetween, and an encoder coupled to one of the first or second leaf contactors, the encoder configured to selectively trigger a camera corresponding to motion of the leaf. The leaf imaging system further includes a lightbox in communication with the leaf-handling subsystem and configured to provide light to the leaf as the leaf passes between the first and the second leaf contactors, and a controller in communication with the encoder, the camera, and the lightbox and configured to operate the camera based on output of the encoder.

A method of imaging a leaf is also disclosed. The method includes placing a leaf between a first leaf contactor and second leaf contactor a leaf-handling subsystem configured to receive the leaf, providing light to the leaf by a lightbox as the leaf moves between the first and the second leaf contactors, encoding movement of the leaf in between the first and the second leaf contactors by an encoder configured to generate a signal in response to movement of the leaf, and selectively triggering a camera signal by a controller and communicate the triggering signal to a camera to obtain images from the leaf in response to the generated encoder signal.

BRIEF DESCRIPTION OF DRAWINGS

FIG. 2c is a side of the leaf imaging system shown in FIGS. 2a and 2b.

DETAILED DESCRIPTION

Figure 1:
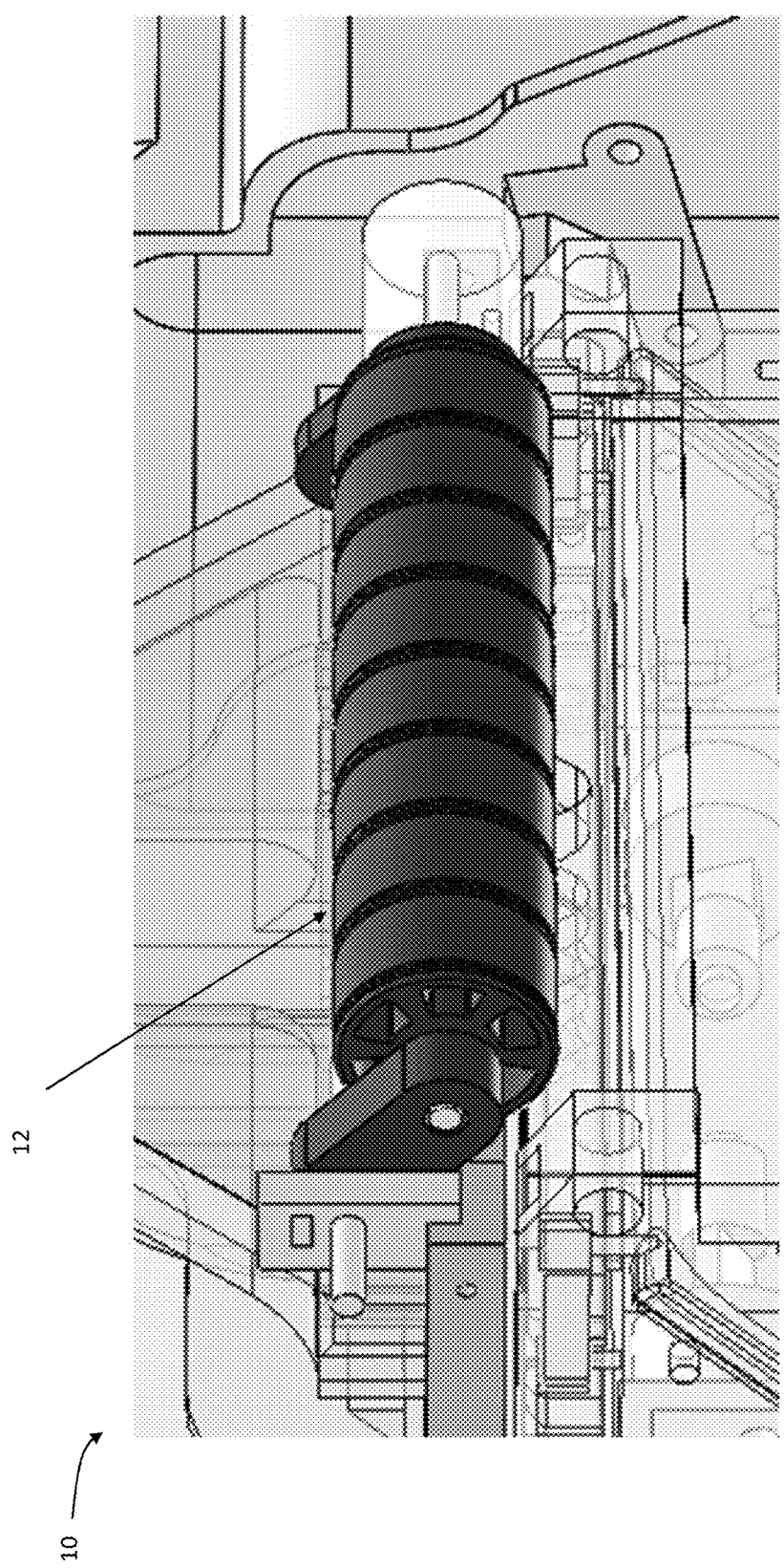
FIG. 1 is a schematic of a first embodiment of a leaf engagement system, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel imaging system is disclosed herein that can provide consistent phenotyping images of leaves to be used for high precision agriculture and phenotyping studies such that leaves of plants are processed consistently. Towards this end, a leaf handling system is disclosed herein such that when a leaf enters the imaging system, it automatically triggers and operates the imaging subsystem based on speed of progression of the leaf through the system.

Figure 2A:
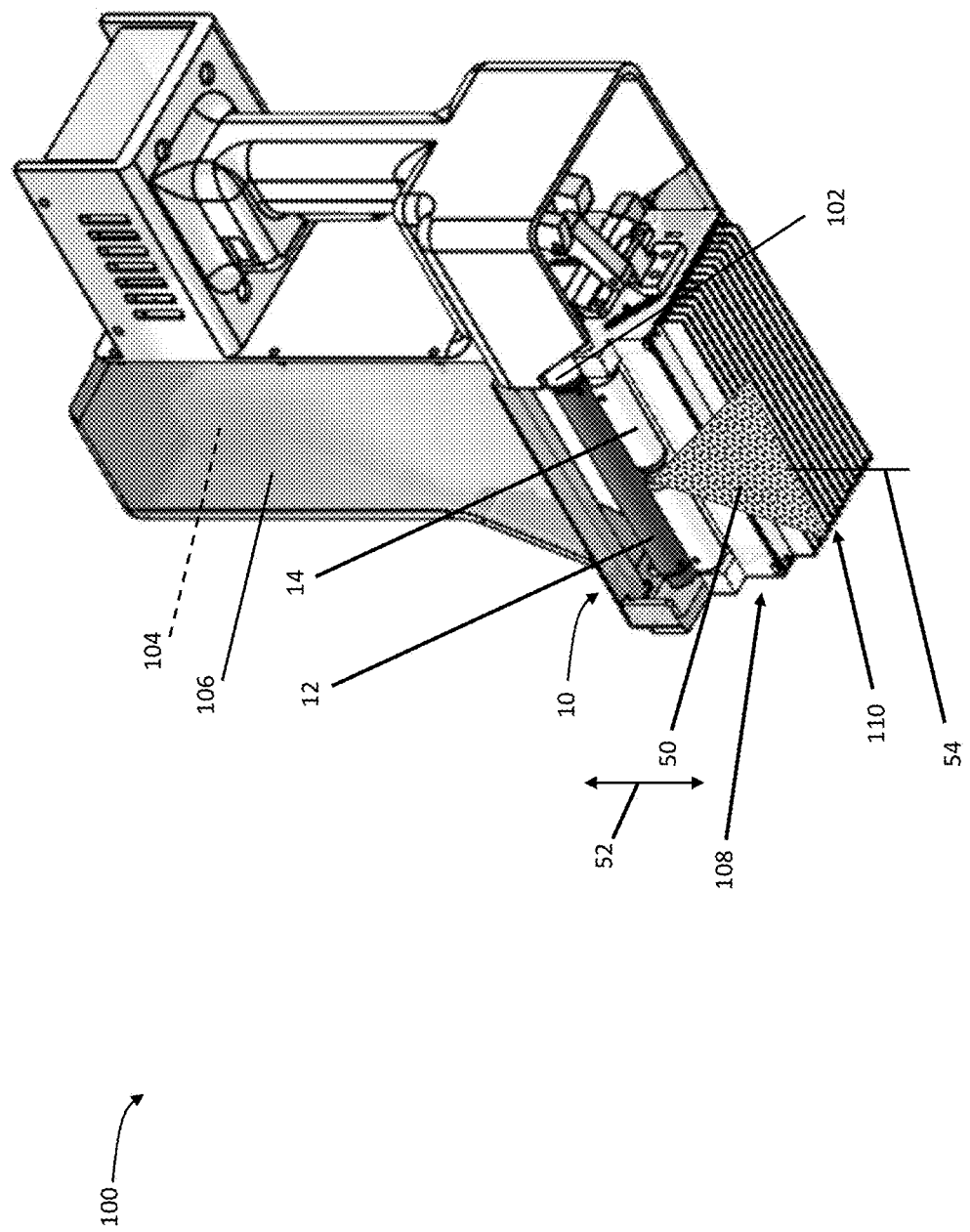
FIGS. 2a and 2b are perspective views of a handheld leaf imaging system, according to a first embodiment.
Figure 2B:
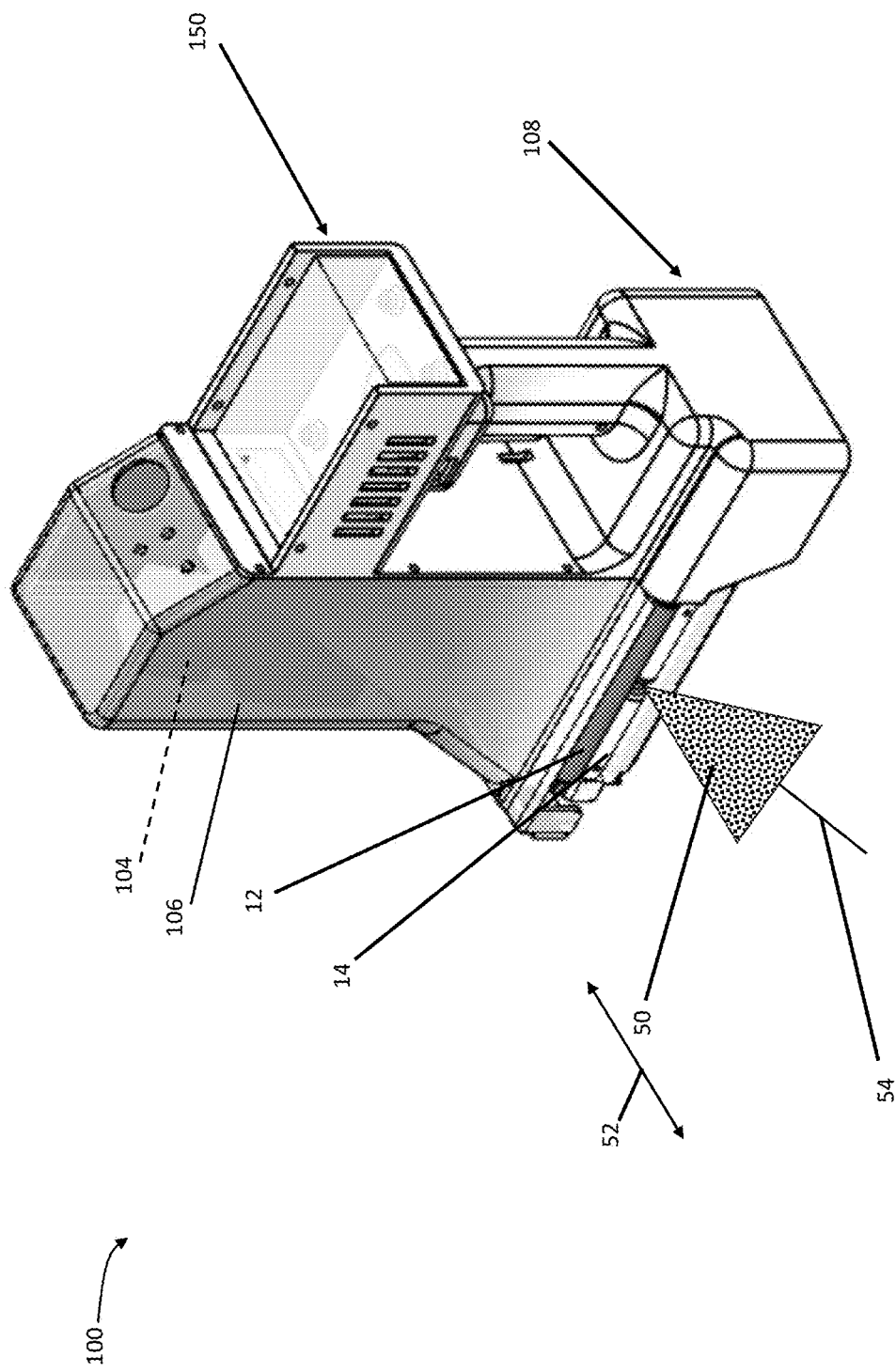

Referring to FIG. 1, a schematic is provided of a first embodiment of a leaf engagement system, in this embodiment a roller system 10, is shown to be used with a system that can be implemented on a high-throughput robotic machine or a hand-held unit. The roller system 10 includes two sets of rollers. One of these rollers 12 is shown in FIG. 1, while both sets are shown in FIGS. 2a-2c (FIGS. 2a and 2b are perspective views of a handheld system 100 while FIG. 2c is a side of the same system 100). In FIGS. 2a-2c the roller system 10 is shown with two sets of rollers 10 and 12 each having an ultrasoft surface configured to prevent damage to surface of a target leaf 50 with arrows 52 showing direction of motion having a stem 54. In the roller system 10 shown in FIGS. 1 and 2a-2c, the target leaf 50 drives the ultra-soft roller surface, e.g., roller 12, which is coupled to a high-resolution encoder 102. The encoder 102 may be an optical encoder, a hall-effect encoder, a variable reluctance encoder, or other types of encoders known to a person having ordinary skill in the art. The encoder 102 generates and communicates pulses to a controller (not shown) housed in a controller housing 150 (see FIG. 2b), via an interface circuitry (not shown), known to a person having ordinary skill in the art, with onboard or off-board non-transient memory housing software, which when executed by the controller (not shown) is configured to receive the signals from the optical encoder 102 when the roller 12 and/or 14 rolls in response to feeding the leaf 50 into the roller system 10. The rotation of the roller 12 and/or 14 and thus generation of the encoder signal by the encoder 102 which is received by the controller (not shown) causes the software to execute a trigger signal by the controller (not shown) to trigger an imaging system having a camera 104 housed in a camera housing 106 that can then begin to acquire images of the leaf passing through the roller system 10. This mechanism ensures the camera 104 can acquire images if and only if the targeted leaf 50 moves in the correct direction and also ensures the image density by activating the camera 104 more or less often based on the speed of rotation of the roller 12 and/or 14 which can be translated to the speed of the leaf as the leaf begins to be fed into the roller system 10. In other words, the rotational speed encoded by the encoder 102 is correlated to how fast the leaf is turning the roller 12 and/or 14 which in turn correlates to how fast the camera 104 obtains images.

The handheld system 100 also includes a lightbox 108 or 208 (see FIGS. 2d and 2e) equipped with one or more light sources (not shown), e.g., a halogen, and a light emitting diode (LED), and a heatsink 110 configured to prevent the lightbox 108 from overheating. A perspective schematic view of the lightbox 108 or 208 (see FIGS. 2d and 2e) is shown in FIG. 3. The lightbox 108 includes an angle-adjustable bulb mount 302 configured to have the light source (not shown) mounted thereon and provide angular adjustability. The lightbox 108 also includes a reflecting plate 304, e.g., made of TEFLON, configured to reflect light upward through opening 306 to thereby allow for generation of a light beam to be shone on to the surface of the leaf 50 (see FIG. 2a) in a light transmission mode. Additionally, the lightbox 108 includes a diffusion reflecting surface 308, e.g., made of aluminum, with a textured surface, which is configured to cause uniform light being applied to the reflecting plate 304 and thus shone out of the opening 306.

The lightbox 108 or 208 (see FIGS. 2d and 2e) may be further outfitted with a built-in EPROM chip (not shown) maintaining corresponding camera setting parameters which can be read by the controller (not shown) automatically. These settings can be uploaded to the camera 104 (see FIG. 2b) or 204 (see FIG. 2d) housed in the camera housing 106 (see FIG. 2b) or 206 (see FIG. 2d), thus saving time of manually adjusting camera settings. Light source within the lightbox 108 (see FIG. 2b) or 208 (see FIGS. 2d and 2e) can be customized to desirable wavelengths suitable for the type of imaging, e.g., red-green-blue (RGB), hyperspectral, or multispectral, as well as the type of leaves.

Figure 2E:
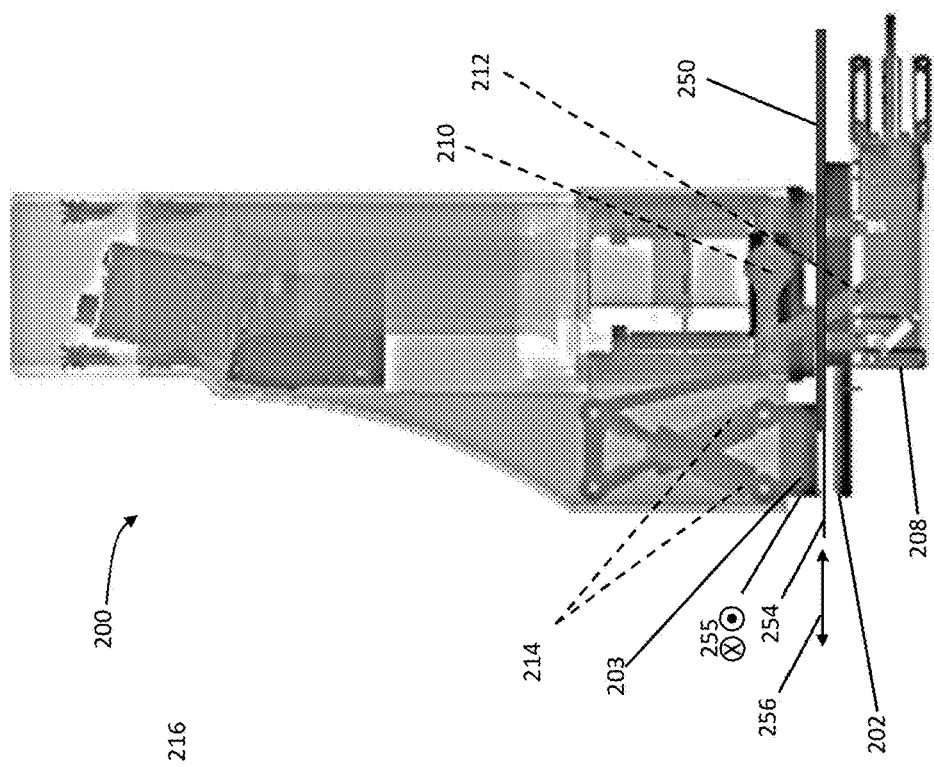
FIGS. 2d and 2e provide a perspective view and a side view of a second embodiment of a handheld leaf imaging system, respectively, according to the present disclosure.
Figure 2D:
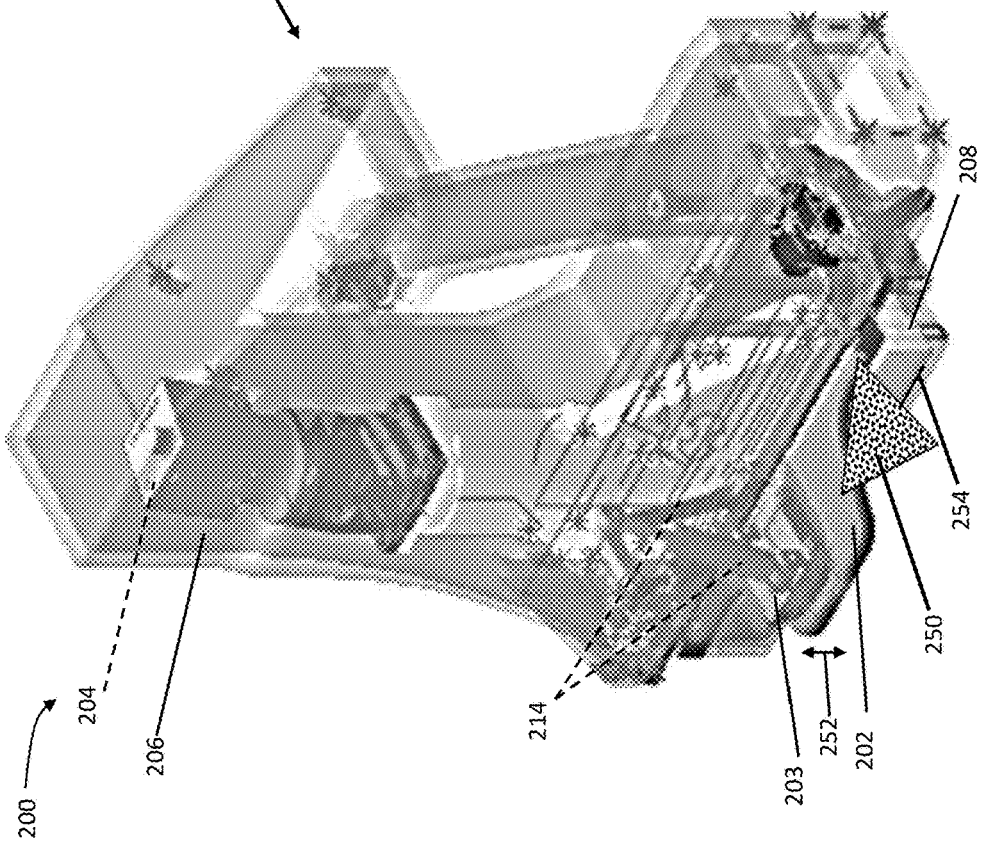
Figure 2F:
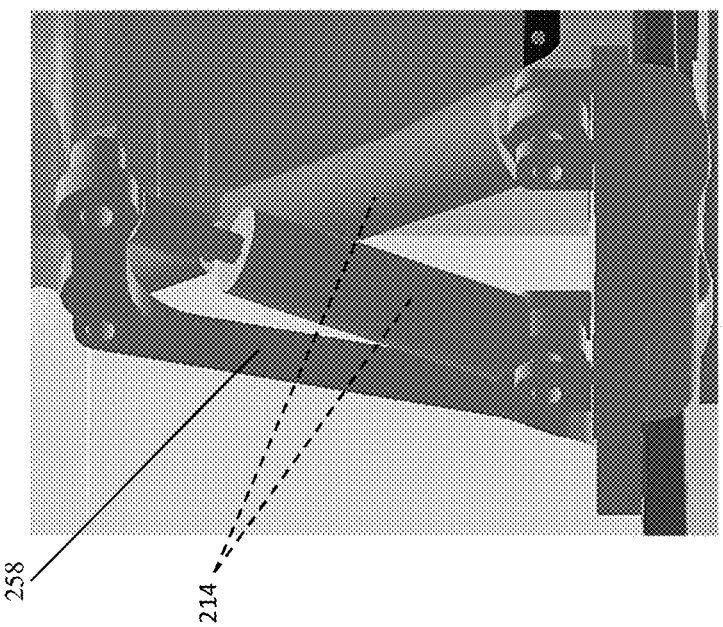
FIG. 2f is a perspective view of 2 struts used in the leaf imaging system shown in FIGS. 2d and 2e.
Figure 3:
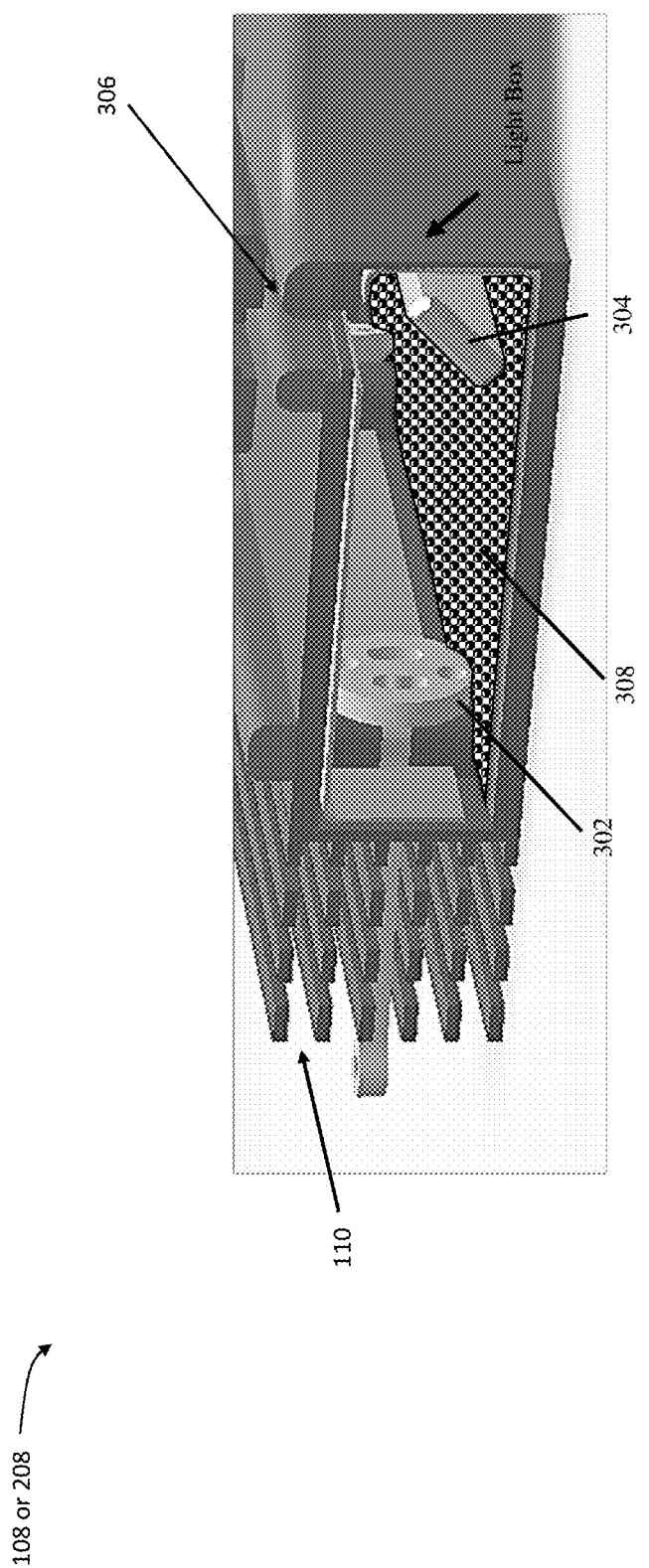
FIG. 3 is a perspective schematic view of a lightbox used in both embodiments shown in FIGS. 2a-2e.

Referring to FIGS. 2d and 2e, a perspective view and a side view of a second embodiment of a handheld unit 200, respectively, are shown which can be implemented on high-throughput robotic machine or as shown in a hand-held unit. In this embodiment, a target leaf 250 having a stem 254 is coupled to engagement members in the forms of a leaf guiding plate 202 and a sensor unit 203. The leaf-guiding plate is coupled to a lightbox 208 which together (i.e., the leaf-handling plate 202 and the lightbox 208) are articulatable in a vertical direction as indicated by an arrow 252 owing to a servomotor 210 and linkages 212. The sensor unit 203 is supported by two pressure adjustable struts 214. When imaging the leaf 250, the leaf guiding plate 202 along with the lightbox 208 are articulated downward according to the arrow 252 in order to generate an opening for placement of the leaf 250 on top of the leaf guiding plate 202. This position constitutes an open position. Next, the leaf guiding plate 202 and the lightbox 208 are collectively articulated upward according to the arrow 252 until the leaf 250 is pinched between leaf guiding plate 202 and the sensor unit 203 according to a maximum upward movement allowed by the servomotor 210. This position constitutes a closed position. When in the closed position, pressure applied to the leaf 250 can be adjusted by adjusting setting on the adjustable struts 214 based on the level of fragility of the leaf 250, which thus minimizes the risk of damaging surface of the leaf 250. FIGS. 2d, 2e, and 2f provide schematics of these two struts in this embodiment. In this embodiment the sensor unit 203 includes an optical flow sensor (e.g., PAA5100 by PIMORONI), not shown, which provides a signal to a controller (not shown) housed in a controller housing 216 (see FIG. 2d) via an interface circuitry (not shown), known to a person having ordinary skill in the art, with onboard or off-board non-transient memory housing software which when executed by the controller (not shown) is configured to receive the signals from the optical flow sensor (not shown) when the leaf 250 is moved side-to-side according to an arrow 256. According to one embodiment, the sensor unit 203 has a curved surface matching a curved surface of the leaf guiding plate 202 to enhance movement of the leaf 250 which triggers motion detection by the optical flow sensor (not shown) while the adjustable struts are selectively adjusted to maintain a predetermined amount of force onto the moving leaf 250. The sensor unit 203 provides movement according to two degrees of freedom. First the sensor unit 203 travels in a vertical direction along the same direction as indicated by the arrow 252 as well as movement into and out of the page in FIG. 2e according to circles with dot and cross 255, owing to linkage 258 shown in FIG. 2f.

Those having ordinary skill in the art will recognize that numerous modifications can be made to the specific implementations described above. The implementations should not be limited to the particular limitations described. Other implementations may be possible.

The invention claimed is:
1. A leaf imaging system, comprising:
a leaf-handling subsystem comprising
a first leaf contactor and a second leaf contactor and configured to receive a leaf in therebetween, and
an encoder coupled to one of the first or second leaf contactors, the encoder configured to selectively trigger a camera corresponding to motion of the leaf;
a lightbox in communication with the leaf-handling subsystem and configured to provide light to the leaf as the leaf passes between the first and the second leaf contactors; and
a controller in communication with the encoder, the camera, and the lightbox and configured to operate the camera based on output of the encoder.

2. The leaf imaging system of claim 1, the encoder is one or more of an optical encoder, a hall-effect encoder, and a variable reluctance encoder.

3. The leaf imaging system of claim 1, the lightbox includes a memory chip maintaining camera setting of the camera.

4. The leaf imaging system of claim 1, wherein the lightbox includes one or more of a halogen light, and a light emitting diode light.

5. The leaf imaging system of claim 1, wherein the lightbox includes a reflective plate having a reflective surface configured to reflect light through an opening.

6. The leaf imaging system of claim 5, wherein the lightbox includes a diffusing reflective surface configured to generate a uniform light shone on the reflective plate.

7. The leaf imaging system of claim 1, the lightbox includes an angel adjustable bulb mount configured to power a bulb.

8. The leaf imaging system of claim 7, the bulb provides light having selective wavelength based on type of imaging and type leaf being imaged, wherein the type of imaging includes one or more of red-green-blue (RGB) type imaging, hyperspectral type imaging, and multispectral type imaging.

9. The leaf imaging system of claim 1, the first and second leaf contactors are each spring-biased rollers configured to receive the leaf in therebetween.

10. The leaf imaging system of claim 1, the first and second leaf contactors are each leaf guiding plates.

11. A method of imaging a leaf, comprising:
placing a leaf between a first leaf contactor and second leaf contactor a leaf-handling subsystem configured to receive the leaf;
providing light to the leaf by a lightbox as the leaf moves between the first and the second leaf contactors;
encoding movement of the leaf in between the first and the second leaf contactors by an encoder configured to generate a signal in response to movement of the leaf; and
selectively triggering a camera signal by a controller and communicate the triggering signal to a camera to obtain images from the leaf in response to the generated encoder signal.

12. The method of claim 11, the encoder is one or more of an optical encoder, a hall-effect encoder, and a variable reluctance encoder.

13. The method of claim 11, the lightbox includes a memory chip maintaining camera setting of the camera.

14. The method of claim 11, wherein the lightbox includes one or more of a halogen light, and a light emitting diode light.

15. The method of claim 11, wherein the lightbox includes a reflective plate having a reflective surface configured to reflect light through an opening.

16. The method of claim 15, wherein the lightbox includes a diffusing reflective surface configured to generate a uniform light shone on the reflective plate.

17. The method of claim 11, the lightbox includes an angel adjustable bulb mount configured to power a bulb.

18. The method of claim 17, the bulb provides light having selective wavelength based on type of imaging and type leaf being imaged, wherein the type of imaging includes one or more of red-green-blue (RGB) type imaging, hyperspectral type imaging, and multispectral type imaging.

19. The method of claim 11, the first and second leaf contactors are each spring-biased rollers configured to receive the leaf in therebetween.

20. The method of claim 11, the first and second leaf contactors are a leaf guiding plate and a sensor unit.

* * * * *